United States Patent [19]
Berg et al.

[11] Patent Number: 5,777,026
[45] Date of Patent: Jul. 7, 1998

[54] SURFACE MODIFIED SILICONE ELASTOMERS FROM AQUEOUS SILICONE EMULSIONS

[75] Inventors: Daniel Trent Berg, Wauwatosa, Wis.; Leon Grant Anthony Hides, New South Wales, Australia; Eric Jude Joffre, Midland, Mich.; Virginia Kay O'Neil, Midland, Mich.; Arthur James Tselepis, Midland, Mich.; Andreas Thomas Franz Wolf, Midland, Mich.

[73] Assignee: Dow Corning Corporation, Midland, Mich.

[21] Appl. No.: 579,799

[22] Filed: Dec. 28, 1995

[51] Int. Cl.$^6$ ...................... C08L 83/00
[52] U.S. Cl. ............ 524/837; 524/457; 524/588; 524/860; 524/863
[58] Field of Search ............... 524/837, 457, 524/588, 860, 863

[56] References Cited

U.S. PATENT DOCUMENTS

| | | | |
|---|---|---|---|
| 2,891,920 | 6/1959 | Hyde et al. | 260/29.2 |
| 3,294,709 | 12/1966 | Nitzsche et al. | 260/23 |
| 3,294,725 | 12/1966 | Findlay et al. | 260/29.2 |
| 3,355,406 | 11/1967 | Cekada, Jr. | 260/29.2 |
| 3,360,491 | 12/1967 | Axon | 260/29.2 |
| 3,438,807 | 4/1969 | Pikula | 117/154 |
| 3,697,469 | 10/1972 | Ikoma | 260/29.2 M |
| 4,163,673 | 8/1979 | Dechert | 106/11 |
| 4,177,177 | 12/1979 | Vanderhoff et al. | 260/29.2 M |

*Primary Examiner*—Karen A. Dean
*Attorney, Agent, or Firm*—Patricia M. Scaduto

[57] ABSTRACT

An aqueous silicone emulsion which upon the evaporation of the water forms a surface modified elastomeric silicone material providing improved coverage and adhesion of paint and reduced staining and coefficients of friction, each relative to other silicone elastomers from aqueous emulsions. The silicone emulsion comprises (A) water; (B) a plurality of particles dispersed in the water comprising a crosslinked product of a diorganosiloxane polymer; (C) a surfactant; and (D) an amount of an oxygen curing compound or a salt thereof effective for the surface modification. If a surface active salt of an oxygen curing compound is used, it may not be required to add additional surfactant in order to form the silicone emulsion.

24 Claims, No Drawings

SURFACE MODIFIED SILICONE ELASTOMERS FROM AQUEOUS SILICONE EMULSIONS

BACKGROUND OF THE INVENTION

1. Field of the Invention

This invention relates to an aqueous silicone emulsion which forms a surface modified silicone elastomer upon the removal of water. This invention also relates to a method of preparing such emulsions.

2. Background Information

The literature teaches that aqueous silicone emulsions are dispersions of siloxane polymers in water. Crosslinking of the siloxane polymers may take place either before or after the evaporation of the water although crosslinking prior to the evaporation of water is more common. Upon the evaporation of water, the silicone emulsions produce silicone elastomeric materials in the form of coatings, seals, caulks, etc.

Generally, silicone elastomers from aqueous silicone emulsions have excellent resistance to weathering, moderate high temperature stability and good low temperature properties. In order for these silicone elastomers to have any appreciable mechanical properties, reinforcement of the elastomer is required. This reinforcement may, for instance, be achieved by use of various fillers, including for example, colloidal silica, precipitated silica or fumed silica, or by silica formed in-situ from precursor silicon-containing compounds.

Due to their property profile, silicone elastomers from aqueous silicone emulsions find use as sealants, coatings, caulks and additives and are used widely in building construction. Other ingredients may also be added depending on the specific use, such as thickeners and rheology modifiers, dispersants, pigments, flatting agents, defoamers, adhesion promoters and freeze-thaw stabilizers.

One disadvantage of silicone elastomers from aqueous silicone emulsions, when used as sealants for buildings, for example, is that they can become dirty and stain the surrounding building materials adjacent to the sealant. This creates an unattractive appearance to the building and cleaning the dirt and stain is very expensive and not always effective. The staining of building materials adjacent to the sealant apparently takes place when materials, such as siloxanes, migrate to these surfaces from the cured sealant and contaminants from the air or precipitation adhere to the surfaces.

Another disadvantage of silicone elastomers from aqueous silicone emulsions is that they do not have surfaces which easily accept coatings which are oftentimes applied to the structures where the sealants and caulks have been applied. Examples of these coatings which can have a decorative or protective purpose are paint, varnishes, lacquers and shellac.

Another property of silicone elastomers from aqueous silicone emulsions is a high dynamic and static friction coefficient to many substrate surfaces. This is especially true if the silicone elastomer from aqueous silicone emulsions are formed having low modulus. They also have high self friction (silicone to silicone). These properties may be advantageous in some applications such as anti-slip coatings. In other applications, however, such as when these elastomers are used to seal a sliding joint as occurs between the stationary and moveable part of a "sliding door", these properties may not be desirable.

Another aspect of having higher dynamic friction coefficients, if combined with poor abrasion resistance, is a so-called "rubbing off" effect which may be observed with silicone elastomers from aqueous silicone emulsions. One example of this problem is illustrated by particles being "rubbed off" a silicone latex glazing sealant. When the window is cleaned, this rubbing off effect occurs due to the friction between the cleaning rag and the sealant causing tiny silicone particles to spread over the transparent window area causing appearance problems.

The objective of this invention is the preparation of an aqueous silicone emulsion which forms silicone elastomeric material upon the evaporation of water with modified surface properties. These modified surface properties include improved coverage and adhesion of paints, reduced coefficient of friction and reduced staining and dirt pick up, in each case relative to other elastomers from aqueous silicone emulsions.

SUMMARY OF THE INVENTION

The aforesaid objective can be achieved by preparing an aqueous silicone emulsion for forming elastomeric silicone material, the silicone emulsion comprising water, a crosslinked product of a diorganosiloxane polymer, a surfactant and an oxygen curing compound. This invention also provides methods for preparing these aqueous silicone emulsions.

DETAILED DESCRIPTION OF THE INVENTION

This invention relates to an aqueous silicone emulsion for forming elastomeric silicone material, the silicone emulsion comprising:

(A) water;

(B) a plurality of particles dispersed in the water comprising a crosslinked product of a diorganosiloxane polymer;

(C) a surfactant for stabilizing the particles dispersed in the water; and (D) an amount of an oxygen curing compound or a salt thereof, effective for surface modification of the silicone elastomeric material formed from the silicone emulsion upon evaporation of the water.

The aqueous silicone emulsions of this invention may be formed by many different methods. For example, they can be prepared by the process of emulsion polymerization, a process well known to those skilled in the art and taught in U.S. Pat. Nos. 2,891,920, 3,294,725, 3,355,406, 3,360,491 and 3,697,469 all of which are incorporated herein by reference. Another method for preparing the aqueous silicone emulsions is by emulsifying preformed diorganosiloxane polymers. This direct emulsification method is also well known to those skilled in the art and taught for example in U.S. Pat. No. 4,177,177, and pending patent applications, Berg, et al. Ser. No. 430047 filed Apr. 27, 1995 "Elastomers from Silicone Emulsions having Self Catalytic Crosslinkers," Berg, et al., now U.S. Pat. No. 5,674,937, Ser. No. 430776 filed Apr. 27, 1995, "Shelf-Stable Crosslinked Emulsion with Optimum Consistency and Handling without the Use of Thickeners", Joffre, et al. Ser. No. 430772, filed Apr. 27, 1995, "Improved Physical Properties from Silicone Latices through Appropriate Surfactant Selection" each of which is hereby incorporated by reference.

With emulsion polymerization, cyclic or linear siloxane oligomers are dispersed in water with a surfactant to form a premixture. Typically, amphoteric, anionic or cationic surfactants are used or mixtures of amphoteric, cationic or anionic surfactants with nonionic surfactants will also work. The premixture is then mixed at high shear until an emulsion comprising an aqueous phase and a dispersed phase comprising droplets of siloxane oligomers, having particle sizes of between 100–5000 nm, is formed. The mixing can take place in any type of commercial mixing equipment, said mixers being well known to those skilled in the art. An acid or base may be added to the premixture either prior to emulsification or after emulsification is complete which catalyzes the emulsion polymerization. Alternatively, the surfactant may be converted to its acidic or basic form using an ion exchange procedure as described in U.S. Pat. No. 3,697,469 which is incorporated by reference. Although the polymerization will proceed satisfactorily at room temperature, it can be run at elevated temperatures as well, a preferred range being 25° C. to 80° C. The time of polymerization will generally take from 1 to 24 hours depending on the temperature and the desired molecular weight of the polymer. After the diorganosiloxane polymer has reached the desired molecular weight, polymerization is terminated by neutralizing the emulsion.

If desired, a crosslinker and if necessary a crosslinking catalyst can be added prior to emulsification or during polymerization. Oftentimes, however, a crosslinker and crosslinking catalyst will be added to the emulsion after polymerization is complete. The crosslinker, in this situation, must be capable of migrating from the water into the dispersed phase and still maintain its reactivity.

The oxygen curing compound or salt thereof may be added at any time during emulsion polymerization, for example as part of the premixture prior to emulsification or after the premixture is emulsified, either prior to or after polymerization. In addition, the oxygen curing compound may be added neat, in solution or as a separately formed emulsion. If the salt of the oxygen curing compound has sufficient surface activity and is added prior to emulsification, another surfactant may not be necessary, the salt being able to stabilize the emulsion in a manner similar to a surfactant.

Any optional ingredients, such as siccatives or driers, adhesion promoters, fillers, pigments, stabilizers, in-situ reinforcement resins, etc. may also be added at any time.

With direct emulsification, a mixture containing diorganosiloxane polymers, surfactant and water is formed at a temperature on the order of 10° C. to 70° C. and then emulsified by mixing with sufficient shear for a sufficient period of time. The diorganosiloxane polymers useful in this process are characterized as having a viscosity of greater than 5000 mPa.s but less than 500,000 mPa.s, however, higher molecular weight polymers can be used if the viscosity is adjusted using solvent, polymer blending etc.

Typically, amphoteric, anionic, cationic or non-ionic surfactants are used singly or as mixtures. The mixing can take place in any type of commercial mixing equipment, said mixers being well known to those skilled in the art.

If required for crosslinking the diorganosiloxane polymer, a crosslinker or crosslinking catalyst or both may be added to the mixture prior to or after the emulsification. If the crosslinker is not added to the mixture before emulsification, the crosslinker must be capable of migrating from the aqueous phase into the dispersed phase and still maintain its reactivity.

The oxygen curing compound or salt thereof, may be added at any time to the mixture, for example, prior to or after the emulsification. In addition, the oxygen curing compound may be added to the mixture neat, in solution or as a separately formed emulsion. If the salt of the oxygen curing compound has sufficient surface activity and is added prior to emulsification, another surfactant may not be necessary, the salt being able to stabilize the emulsion in a manner similar to a surfactant.

Additional amounts of water may be also be added at any stage of the process if a lower polymer solids content is desired. Typical polymer solids content are 10–96%. Preferred polymer solids contents are 20–85%. Any optional ingredients, such as siccatives or driers, adhesion promoters, fillers, pigments, stabilizers, in-situ reinforcement resins, etc. may also be added at any stage of the process.

Component (A) of the aqueous silicone emulsion is water and it is generally present in the silicone emulsion in an amount from 8 to 1000 parts by weight based on 100 parts by weight diorganosiloxane polymer. The preferable amounts of water and when the water can be added is dependent on how the emulsion is formed, i.e. by emulsion polymerization or direct emulsification but is not critical to the invention. In one preferred method using direct emulsification, a small amount of water, for example 2 to 5 parts by weight based on 100 parts by weight diorganosiloxane polymer, is added before emulsification and then the emulsion is diluted with additional water to the desired polymer solids content.

Component (B) of the aqueous silicone emulsion is a plurality of particles dispersed in the water comprising a crosslinked product of a diorganosiloxane polymer.

The crosslinked product can be obtained in a number of ways. For example, the diorganosiloxane polymers may be able to self-crosslink, i.e. crosslink amongst themselves, or a crosslinker can be added and reacted with the diorganosiloxane polymers in the presence of a crosslinking catalyst, as needed.

The term "diorganosiloxane polymer" as used herein comprises siloxane compositions having mixtures of various types of siloxane polymers as well as compositions having only a single type of siloxane polymer. The diorganosiloxane polymers can also be a homopolymer, copolymer or terpolymer. In addition, the term includes different kinds of molecules, such as long chain linear or branched molecules and short chain linear or branched molecules. The only restriction placed on the siloxane polymers comprising the "diorganosiloxane polymers" of this invention is that they must be capable of forming a silicone elastomeric material. The compositions included under the term "diorganosiloxane polymers" and used in the present invention are well known to those skilled in the art. The diorganosiloxane polymers useful in the present invention include, for example, diorganosiloxane polymers described by the following molecular formula:

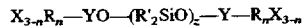

$$X_{3-n}R_n\text{—}YO\text{—}(R'_2SiO)_z\text{—}Y\text{—}R_nX_{3-n}$$

where n is 0, 1, 2 or 3;

z is an integer from 200 to 10,000;

X is a hydroxyl group, an alkenyl group or any hydrolyzable group;

Y is a Si atom or a —Si—$(CH_2)_m$SiR'$_2$— group with m being a positive integer;

R is individually selected from the group consisting of substituted and unsubstituted monovalent hydrocarbon radicals having from 1–15 carbon atoms; and R' is individually selected from the group consisting of X and substituted and unsubstituted monovalent hydrocarbon radicals having from 1–15 carbon atoms, provided, at least 90% of the R' groups are selected from unsubstituted monovalent hydrocarbon radicals having from 1–15 carbon atoms.

The letter X in the formula represents one or more groups bonded to a silicon atom and can be a hydroxyl group, an alkenyl group or any hydrolyzable group. Alkenyl groups which are suitable in this invention and can be represented by X include vinyl, allyl and hexenyl. Hydrolyzable groups include any group attached to silicon which is hydrolyzed by water at room temperature. Suitable hydrolyzable groups that can be represented by x include but are not limited to hydrogen; halogen atoms such as chlorine, bromine, fluorine or iodine; groups of the formula —OT when T is any hydrocarbon or halogenated hydrocarbon group such as methyl, ethyl, iso-propyl, octadecyl, allyl, hexenyl, cyclohexyl, phenyl, benzyl, beta-phenylether, 2-chloroethyl, chlorophenyl, 3,3,3-trifluoropropyl, or bromocyclohexyl; any hydrocarbon ether radical such as 2-methoxyethyl, 2-ethoxyisopropyl, 2-butoxyisobutyl, p-methoxyphenyl or —(CH$_2$CH$_2$O)$_2$CH$_3$; any acyl radical such as acetyl, propionyl, benzoyl, cyclohexoyl, acrylyl, methacrylyl, stearyl, naphthoyl, trifluoroacetyl, chlorobenzoyl or bromopropionyl; any acyloxy group such as acetoxy, benzoyloxy, propionoxy, or acryloxy; or any amino radical such as NH$_2$, dimethylamino, diethylamino, ethylmethylamino, diphenylamino, methylphenylamino or dicyclohexylamino. X can also be any aminoxy radical of the formula —ONT$_2$ or —ONT' in which T is as defined above and T' is any divalent hydrocarbon radical both valences of which are attached to the carbon, such as hexylene, pentylene or octylene; any ketoxime radical of the formula —ON═CT$_2$ or —ON═CT' in which T and T' are defined above; ureido groups of the formula —N(T)CONT"$_2$ in which T is defined above and T" is H or any of the T radicals; carbamate groups of the formula —OOCNTT" in which T and T" are defined above; of carboxylic amide radicals of the formula —NTC═O(T") in which T and T" are defined above. X can also be the sulfate group or the sulfate ester groups of the formula —OSO$_2$(OT) where T is as defined above; the cyano group; the isocyanate group; and the phosphate or phosphate ester groups of the formula —OPO(OT)$_2$ where T is as defined above.

Hydroxyl groups, aminoxy groups and alkoxy groups are preferred groups for X. Illustrative examples of aminoxy groups are —ONEt$_2$, —ONMe$_2$ and the like, where Et is ethyl and Me is methyl. Illustrative examples of alkoxy groups are methoxy, ethoxy, propoxy, isobutoxy, pentoxy, hexoxy, 2-ethylhexoxy and the like. The most preferred group for X is the hydroxyl group.

The letters R and R' in the formula represent substituted or unsubstituted monovalent hydrocarbon groups having from 1–15 carbon atoms bonded to a silicon atom which may or may not be identical, provided at least 90% of the R' groups are unsubstituted monovalent hydrocarbon radicals having from 1–15 carbon atoms. Examples of suitable substituted and unsubstituted monovalent hydrocarbon radicals that can be represented by R and R' include but are not limited to alkyl radicals such as methyl, ethyl, isopropyl, hexyl, octadecyl or myricyl; alkenyl radicals such as vinyl, allyl or hexenyl; alkynal radicals such as propargyl, cycloaliphatic radicals such as cyclopentyl, cyclohexyl or cyclohexenyl; aromatic hydrocarbons such as phenyl, tolyl, xylyl, xenyl, naphthyl or anthracyl; aralkyl hydrocarbon radicals such as benzyl, beta-phenylethyl, beta-phenylpropyl or gamma-tolylpropyl; halogenated hydrocarbon or carbon radicals such as 3,3,3-trifluoropropyl, tridecafluoro-1,1,2,2-tetrahydrooctyl)-1-methyl or perfluoroalkyl; epoxy radicals such as 2,3-epoxypropyl, epoxyethyl, 2-(3,4 epoxycyclohexyl) or 3,4 epoxybutyl; amino radicals such as aminoethyl, aminoethylaminopropyl, 2-aminobutyl, 3-aminopropyl or methyl aminopropyl; mercapto radicals such as 3-mercaptopropyl or mercaptomethyl; and methacrylo radicals such as 3-methacryloxypropyl. In addition, R' may be represented by X.

R and R' are preferably methyl groups or methyl and phenyl groups. Most preferably both R and R' are methyl groups.

The letter Y represents a single silicon atom (Si) or a group which includes methylene spacer groups attached to silicon, having the formula —Si—(CH2)$_m$SiR'$_2$— where m is a positive integer. Y is preferably a silicon atom for this invention.

Although the diorganosiloxane polymers useful in this invention are limited only to the extent that they must be capable of forming a silicone elastomeric material, certain diorganosiloxane polymers are preferred, including hydroxyl endblocked polydimethylsiloxane (PDMS), hydroxyl and trimethyl endblocked PDMS, ethylene trialkoxysilyl endblocked PDMS and ethylene dialkoxyalkylsilyl endblocked PDMS, where preferred alkoxy groups include methoxy and ethoxy and the preferred alkyl group is methyl. Hydroxyl endblocked PDMS is the most preferred diorganosiloxane polymer.

The diorganosiloxane polymers which are present as a mixture can be prepared by mixing the individual diorganosiloxane polymers prior to emulsification or by emulsifying them individually and then mixing the emulsions.

When the diorganosiloxane polymer has an average of more than two condensable or hydrolyzable groups per molecule, it is not necessary to have a crosslinker present in order to form a crosslinked product. The condensable or hydrolyzable groups on different diorganosiloxane polymer molecules can react with each other to form the required crosslinks. Even though a crosslinker is not required, it may be desirable to use one as determined by the person skilled in the art.

When the diorganosiloxane polymer does not on average have more than two hydrolyzable or condensable groups, a crosslinker must be added to form a crosslinked product. Depending on the crosslinker added a crosslinking catalyst may also be required for the crosslinking to occur. The crosslinkers and crosslinking catalysts of the present invention depend on the type of silicon cure system employed to cure the composition. These crosslinkers, crosslinking catalysts and curing mechanisms are well known to those skilled in the art, and are discussed generally in Berg, et al., Ser. No. 430776 filed Apr. 27, 1995, "Shelf-Stable Crosslinked Emulsion with Optimum Consistency and Handling without the Use of Thickeners", which is incorporated herein by reference.

Typically, the crosslinker is an organosilicon compound which contains at least two hydrolyzable groups bonded to a silicon atom. However, when the molecular chain ends of the diorganosiloxane polymer are hydrolyzable groups and not silanol groups, the crosslinker can be a silanol-containing organosilicon compound. These hydrolyzable groups are the same as those described earlier for letter X of the diorganosiloxane polymer. In essence, any crosslinker known from the art for crosslinking aqueous silicone emulsions may be used in this invention.

As long as the crosslinker contains an average of at least two hydrolyzable groups or an average of at least two hydroxyl groups bonded to silicon, depending on the diorganosiloxane polymers, other types of groups may also be bonded to silicon. The molecular structure of the crosslinker is a silane or siloxane structure. In addition, the siloxane type crosslinkers may be straight chain, branched chain or cyclics. Examples of these groups other than hydrolyzable groups which can be attached to silicon of the crosslinker, include the monovalent substituted and unsubstituted hydrocarbon groups described earlier for R and R'. Examples of specific crosslinkers include low molecular weight organosilicon hydrides, such as polymethylhydrogensiloxane, low molecular weight copolymers containing methylhydrogensiloxy and dimethylsiloxy groups, —(OSi(OEt)$_2$—, ethylpolysilicate, (OSiMeC$_2$H$_4$Si(OMe)$_3$)$_4$, (OSi—ON=CR'$_2$)$_4$, methyltrimethoxysilane, tetraethylorthosilicate, isobutyltrimethoxysilane, ethyltriacetoxysilane, methyltriacetoxysilane, vinyltriacetoxysilane, vinyltrioximosilane and Me$_3$SiO(Me$_2$SiO)$_3$(Me(ON(Et)$_2$SiO)$_5$SiMe$_3$, where Me is methyl and Et is ethyl. The crosslinker may be added as a single species or as a mixture of two or more different species.

Preferred crosslinkers are selected from the group consisting of alkoxy silanes and aminoxy functional siloxanes, including but not limited to, methyltrimethoxysilane, isobutyltrimethoxysilane, Me$_3$SiO(Me$_2$SiO)$_3$(Me(ON(Et)$_2$SiO)$_5$SiMe$_3$ and tetraethylorthosilicate. Aminoxy functional siloxanes are most preferred.

Generally, the crosslinker when used in the invention is added at 0.1 to 50 parts by weight based on 100 parts by weight diorganosiloxane polymer and preferably 1 to 10 parts by weight based on 100 parts by weight diorganosiloxane polymer.

A crosslinking catalyst serves to accelerate the crosslinking reaction between the diorganosiloxane polymer and a crosslinker. Crosslinking catalysts are not necessary with every crosslinker. For example, when crosslinkers contain acetoxy, aminoxy, amino or ketoximo groups, a crosslinking catalyst is not necessary, however, it still may be desirable to use one. A crosslinking catalyst may also not be necessary if the diorganosiloxane polymer contains these specific groups.

Examples of suitable crosslinking catalysts employed in the crosslinking reaction between the diorganosiloxane polymer and the crosslinker are: organometallic compounds, amino compounds, carboxylic acids, salts of amino compounds with carboxylic acids or other acids, low molecular weight polyamide resins obtained by the reaction of excess polyamines with polybasic acids, the reaction products between epoxy compounds and an excess of polyamines, or mixtures of the above described compounds.

Specific examples of organometallic compounds are the salts of carboxylic acids, alcoholates and halides of the metals lead, zinc, zirconium, titanium, antimony, iron, cadmium, tin, barium, calcium or manganese as taught in U.S. Pat. Nos. 3,355,406, 3,706,695, 4,100,124, 4,288,356, 4,587,288, and 4,608,412, which are incorporated herein by reference. Further specific examples of organometallic compounds are organotin compounds such as dibutyltindilaurate, dibutyltindiacetate and stannous octoate; titanic acid esters and chelates, such as tetrabutyl titanate, tetrapropyl titanate, titanium tetraacetyl acetonate, or dibutoxytitanium bis(ethyl acetoacetate); zirconium chelates, such as zirconium tetraacetyl acetonate; organo aluminum compounds, such as aluminum trisacetyl acetonate, aluminum trisethyl acetoacetonate, or diisopropoxy aluminum ethyl acetoacetonate, etc.

Specific examples of amino compounds are butyl amine, octyl amine, dibutyl amine, monoethanol amine, diethanol amine, triethanol amine, diethylene triamine, triethylene tetramine, triethylene diamine, oleyl amine, cyclohexyl amine, benzyl amine, diethylaminopropyl amine, xylylene diamine, guanidine, diphenyl guanidine, 2,4,6-tris (dimethyl aminomethyl) phenol, morpholine, N-methyl morpholine, 2-ethyl-4-methylimidazole, 1,8-diazabicyclo (5,4,0) undecene-7, aminosilanes, such as g-amino propyltrimethoxysilane or N-(b-aminoethyl)-g-aminopropylmethyldimethoxysilane.

Specific examples of carboxylic acids are formic acid, acetic acid, etc.

Further compounds suitable for catalyzing the crosslinking reactions are group VIII transition metal (noble metal) compounds such as platinum. The noble metal catalyst is selected from any of those well known to the art, such as those described in U.S. Pat. No. 3,923,705 and 3,419,593, said patents being incorporated by reference.

Preferred crosslinking catalysts are organotin compounds, including but not limited to dibutyltindilaurate, dibutyltindiacetate and stannous octoate.

Generally, crosslinking catalysts when used in this invention, are added at 0.000001 to 5 parts by weight based on 100 parts by weight diorganosiloxane polymer. Preferably, the crosslinking catalyst is present in an amount from 0.00001 to 2 parts by weight based on 100 parts by weight diorganosiloxane polymer and more preferably 0.06 to 2 parts by weight based on 100 parts by weight diorganosiloxane polymer. The crosslinking catalyst may be added as a single species or as a mixture of two or more different species.

The crosslinkers or crosslinking catalysts may be added either individually before or after emulsification, or both added before or after emulsification. For ease of compounding, however, it is preferred to add both as necessary prior to emulsification.

The particles of crosslinked product are generally stabilized in water by the addition of Component (C) which is a surfactant. The term "surfactant" is meant to describe a surface active agent selected from cationic surfactants, anionic surfactants, amphoteric surfactants, nonionic surfactants and mixtures thereof. In one embodiment of the invention, when a salt of an oxygen curing compound which has surface active properties is used, it is not necessary to also add a separate surfactant, however, it may be added if desired. Each of the types of surfactants described above which are known in the art as being useful in emulsification, whether individually or combined with another type of surfactant, are useful as the surfactant in the instant invention. Different types of surfactants are preferred depending on which method is used to prepare the aqueous silicone emulsion. For example, when the silicone emulsion is prepared via direct emulsification, nonionic surfactants are preferred. When the silicone emulsion is prepared via emulsion polymerization anionic or a mixture of nonionic and anionic surfactants are preferred.

Suitable cationic surfactants include, but are not limited to, aliphatic fatty amines and their derivatives such as dodecylamine acetate, octadecylamine acetate and acetates of the amines of tallow fatty acids; homologues of aromatic amines having fatty chains such as dodecylanilin; fatty amides derived from aliphatic diamines such as undecylimidazoline; fatty amides derived from disubstituted amines such as oleylaminodiethylamine; derivatives of ethylene diamine; quaternary ammonium compounds such as tallow trimethyl ammonium chloride, dioctadecyldimethyl ammonium chloride, didodecyldimethyl ammonium chloride and dihexadecyldimethyl ammonium chloride; amide derivatives of amino alcohols such as beta-hydroxyethylsteraryl amide; amine salts of long chain fatty acids; quaternary ammonium bases derived from fatty amides of di-substituted diamines such as oleylbenzylamino-ethylene diethylamine hydrochloride; quaternary ammonium bases of the benzimidazolines such as methylheptadecyl benzimidazole hydrobromide; basic compounds of pyridinium and its derivatives such as cetylpyridinium chloride; sulfonium compounds such as octadecylsulfonium methyl sulfate; quaternary ammonium compounds of betaine such as betaine compounds of diethylamino acetic acid and octadecylchloromethyl ether; urethanes of ethylene diamine such as the condensation products of stearic acid and diethylene triamine; polyethylene diamines; and polypropanolpolyethanol amines.

Suitable anionic surfactants include, but are not limited to, sulfonic acids and their salt derivatives such as described in U.S. Pat. No. 3,294,725 to Findley et al. which patent is hereby incorporated by reference. These anionic surfactants can be exemplified by, but are not limited to, alkali metal sulforicinates; sulfonated glycerol esters of fatty acids such as sulfonated monoglycerides of coconut oil acids; salts of sulfonated monovalent alcohol esters such as sodium oleylisethionate; amides of amino sulfonic acids such as the sodium salt of oleyl methyl tauride; sulfonated products of fatty acids nitriles such as palmitonitrile sulfonate; sulfonated aromatic hydrocarbons such as sodium alphanaphthalene monosulfonate; condensation products of naphthalene sulfonic acids with formaldehyde; sodium octahydroanthracene sulfonate; alkali metal alkyl sulfates, ether sulfates having alkyl groups of 8 or more carbon atoms, and alkylarylsulfonates having 1 or more alkyl groups of 8 or more carbon atoms.

Suitable amphoteric surfactants include, but are not limited to, lecithin, glycinates, betaines, sultaines and alkyl aminopropionates. These can be exemplified by cocoamphglycinate, coco-amphocarboxy-glycinates, cocoamidopropylbetaine, lauryl betaine, cocoamidopropylhydroxy-sultaine, laurylsulataine, and cocoamphodipropionate.

Useful nonionic surfactants may be exemplified, but not limited to, polyoxyalkylene alkyl ethers, polyoxyalkylene sorbitan esters, polyoxyalkylene esters, polyoxyalkylene alkylphenyl ethers, ethoxylated amides, ethoxylated siloxanes, block copolymers of propylene oxide and ethylene oxide and others.

Non-ionic surfactants are preferred with polyoxyalkylene alkyl ethers such as Tergitol® TMN-6 and Tergitol® TMN-10 and Triton® X-100 being more preferred.

Generally, a surfactant is added in an amount from 0.1 to 10 parts by weight based on 100 parts by weight diorganosiloxane polymer. Preferably, the surfactant is present in an amount from 0.5 to 5 parts by weight based on 100 parts by weight diorganosiloxane polymer.

Component (D) of the invention is an amount of an oxygen curing compound or a salt thereof, effective for surface modification of the silicone elastomeric material formed from the silicone emulsion upon evaporation of the water. The term "oxygen curing compound" as used herein means one or more compounds which harden and dry, or in other words cure, by reacting with oxygen, such as oxygen in the atmosphere (air) at ambient conditions. The term oxygen curing compound as used herein includes a single oxygen curing compound or a mixture of different oxygen curing compounds.

The oxygen curing compounds and the salts thereof, are most effective if they either show a certain degree of inherent incompatibility with the elastomeric silicone material or develop such incompatibility with the elastomeric silicone material during their oxidative cure. Generally, the oxygen curing compounds are compounds having aliphatic unsaturated bonds. The oxygen curing compounds can be ester compounds resulting from the reaction of an unsaturated fatty acid having at least one aliphatic double bond and alcohols. Preferably, the unsaturated fatty acids are aliphatic carboxylic acids or anhydrides having at least 10 carbon atoms. The unsaturated fatty acids include oleic, linoleic, linolenic, eleosteric, licanic, ricinoleic and arachidonic acids. The ester compounds include mixtures which preferably contain at least 80 weight percent of the ester compounds made from unsaturated fatty acids. Many of the unsaturated fatty acid esters can be found in natural drying oils such as tung oil, linseed oil, vernonia oil and oiticica oil and modified natural drying oils such as boiled linseed oil and dehydrated castor oil.

Natural drying oils and in particular, tung oil, linseed oil and oiticica oil are the preferred oxygen curing compounds of this invention. Tung oil is more preferred because in addition to drying relatively quickly, it also causes only limited discoloration of the modified surface, i.e. yellowing, relative to other oxygen curing compounds.

The salts of oxygen curing compounds are the reaction product of organic or inorganic bases and compounds having aliphatic unsaturated bonds, for example, the unsaturated fatty acid esters described above. Examples of organic types of bases include morpholine, ethylamine, diethylamine, triethylamine, ethylene diamine, butylamine, hexylamine, triethanolamine, diethyl-ethanolamine, $R(CH_3)_2N$, where R is as described earlier, N,N-dimethyl-cocoamine and e-caprolactam. Examples of inorganic types of bases include ammonium hydroxide, sodium hydroxide and potassium hydroxide. Examples of the oxygen curing compounds useful as salts are the same as those described for oxygen curing compounds generally and in particular the natural drying oils.

Preferred salts of oxygen curing compounds are the reaction product of organic bases and natural drying oils with the morpholine salt of tung oil being more preferred.

An effective amount of oxygen curing compound or salt thereof in the present invention is that amount which must be added in order to produce surface modification of the elastomeric silicone material formed from the aqueous silicone emulsion upon evaporation of the water. Generally, adding an amount in the range of 0.1 to 30 parts by weight based on 100 parts by weight of diorganosiloxane polymer will be effective with from 0.1 to 10 parts by weight based on 100 parts by weight of diorganosiloxane polymer being preferred and 1 to 5 parts by weight based on 100 parts by weight of diorganosiloxane polymer being more preferred.

It is believed that the oxygen curing compounds and salts thereof do not react with the polydiorganosiloxane polymers, the crosslinked product or the elastomeric silicone material formed therefrom. Rather, as water is removed from the aqueous silicone emulsion, the inherent or developing incompatibility between the oxygen curing compounds or salts thereof and the elastomeric silicone material drives the oxygen curing compounds or salts thereof to the surface of the elastomeric silicone material. As used herein, "surface" means the interface between the elastomeric silicone material and the atmosphere. On the surface of the elastomeric silicone material, the oxygen curing compounds and salts thereof coalesce amongst themselves forming a film.

The oxygen curing compound can be added neat, in solution or as a separately formed emulsion. One benefit of the salt of the oxygen curing compound is that it may remain in the water phase of the emulsion. Having the oxygen curing compound remain in the water phase appears to decrease the time necessary for the oxygen curing compound to migrate to and coalesce on the surface of the elastomeric silicone material produced as the water evaporates. In addition, certain salts of oxygen curing compounds may have surface active properties which enable them to also perform the function of a surfactant during the formation of the aqueous silicone emulsion. Therefore, these surface active salts of oxygen curing compounds can be used individually or in conjunction with another surfactant to stabilize the aqueous silicone emulsion. In a preferred embodiment of the invention, for example, when the morpholine salt of tung oil is used, it is not necessary to add a separate surfactant in order to form a stable aqueous silicone emulsion.

The point of addition of the oxygen curing compound or salt thereof is not critical to the invention and it can be added at any stage during the compounding process. For ease of compounding, however, it is preferable to add the oxygen curing compound or salt thereof prior to emulsification of the diorganosiloxane polymers.

Although the film formed on the surface of the silicone elastomeric material by the oxygen curing compounds will dry and harden over time when exposed to oxygen, it is often desirable to accelerate these processes. It is well known in the art that the addition of compounds known as "driers" or "siccatives" will accelerate the drying and hardening processes. With the present invention, the addition of driers is preferred because they appear to accelerate the rate at which the oxygen curing compounds and the salts thereof become incompatible with the silicone elastomeric material.

Driers can be "top or surface driers" which will catalyze drying at the surface of the film formed by the oxygen curing compound, or "through" driers which will catalyze drying through the film formed by the oxygen curing compound. Examples of top driers include cobalt and lead salts such as cobalt octoate. "Through" driers include manganese and zirconium salts such as zirconium octoate. In order to achieve homogeneous, accelerated drying, a mixture of top and through driers is preferably used.

These driers can be added at any point in the compounding, although for ease of compounding it is preferred to add them prior to emulsification of the diorganosiloxane polymers.

Generally, the driers may be added in amounts ranging from 0.003 to 2.5 parts by weight metal content based on 100 parts by weight of diorganosiloxane polymer and preferably 0.05 to 2.0 parts by weight metal content based on 100 parts by weight of diorganosiloxane polymer. In a preferred embodiment of this invention the aqueous silicone emulsion includes a mixture of at least one surface drier and at least one through drier, such as cobalt octoate and zirconium octoate.

Additional optional ingredients such as fillers and other ingredients may be added to the composition of the invention to affect certain performance properties of the silicone emulsion or the silicone elastomeric material formed therefrom. Reinforcing and extending fillers include calcium carbonate, titanium dioxide, zinc oxide iron oxide or kaolin clay. Fillers which may be used to achieve fire retardency or electrical arc resistance include aluminum trihydrate, fumed titania or zinc borate. Other optional ingredients, including adhesion promoters, pigments, stabilizers, in-situ reinforcement resins, etc. may also be added to the silicone emulsion.

All of these additional optional ingredients should be tested to ensure that they do not adversely affect the properties or storage stability of the silicone emulsion or the elastomeric material formed upon drying the emulsion. The characteristics of the aqueous silicone emulsion and silicone elastomeric material can be varied to give the desired characteristics by varying these additional optional ingredients.

The aqueous silicone emulsions of this invention may be formulated and sold, for coating and sealant applications for example, as one-part or two-part compositions. For a two-part composition, the oxygen curing compound or salt thereof may be kept neat, in solution or as a separate emulsion in a separate container. The oxygen containing compound or salt thereof is then added to the preformed emulsion of diorganosiloxane, water, surfactant, crosslinker, if any, crosslinking catalyst, if any and other optional ingredients to form the silicone emulsion just prior to the application. This addition may be achieved by mechanically mixing the oxygen curing compound or salt thereof with the preformed emulsion portion using suitable means such as static or dynamic mixers.

Alternatively, and for most applications preferably, a one-part product can be formulated where the aqueous silicone emulsion is formed during the initial compounding stage.

The aqueous silicone emulsions of this invention may be formed by emulsion polymerization or direct emulsification with direct emulsification being preferred.

One method of forming the aqueous silicone emulsion using an oxygen curing compound comprises mixing at high shear, 8 to 1000 parts by weight water; 100 parts by weight diorganosiloxane polymer; 0.1 to 10 parts by weight surfactant; 0.1 to 30 parts by weight oxygen curing compound, optionally, 0.1 to 50 parts by weight crosslinker; optionally, 0.000001 to 5 parts by weight crosslinking catalyst; optionally, 0.003 to 2.5 parts by weight metal content of a drier; and a filler until an aqueous silicone emulsion is formed.

A preferred method of forming the aqueous silicone emulsion using an oxygen curing compound comprises mixing at high shear and at a temperature between 20°–70° C.; 2 to 5 parts water; 100 parts by weight —OH endblocked PDMS polymer; 0.1 to 10 parts by weight natural drying oil; 1 to 10 parts by weight of a crosslinker; optionally, 0.00001 to 2 parts by weight of a crosslinking catalyst; 0.5 to 5.0 parts by weight of a nonionic surfactant; 0.05 to 2 parts by weight metal content of a mixture of a surface drier and a through drier and a filler, until a silicone emulsion is formed, then the silicone emulsion is diluted with water to the desired polymer solids content.

A more preferred method of forming the aqueous silicone emulsion using an oxygen curing compound comprises mixing at high shear and at about 25° C., 2 to 5 parts water; 100 parts by weight —OH endblocked PDMS polymer; 1 to 5 parts by weight tung oil; 1 to 10 parts by weight of a crosslinker selected from the group consisting of an alkoxy silane and an aminoxy functional siloxane; 0.06 to 2 parts by weight of an organotin compound crosslinking catalyst; 0.5 to 5 parts by weight of a nonionic surfactant; 0.05 to 2 parts by weight metal content of a mixture of a surface drier and a through drier and a filler until an aqueous silicone emulsion is formed, then the emulsion is diluted with water to the desired polymer solids content.

The most preferred method for forming the aqueous silicone emulsion using an oxygen curing compound comprises mixing at high shear and at about 25° C., 2 to 5 parts water; 100 parts by weight —OH endblocked PDMS polymer; 1 to 5 parts by weight tung oil; 1 to 10 parts by weight of an aminoxy functional siloxane crosslinker; 0.5 to 5 parts by weight of a nonionic surfactant; 0.05 to 2 parts by weight metal content of a mixture of a surface drier and a through drier and a filler until an aqueous silicone emulsion is formed, then the emulsion is diluted with water to the desired polymer solids content.

One method of forming the aqueous silicone emulsion using a surface active salt of an oxygen curing compound comprises mixing at high shear, 8 to 1000 parts by weight water; 100 parts by weight diorganosiloxane polymer; 0.1 to 30 parts by weight of a surface active salt of an oxygen curing compound; optionally, 0.1 to 50 parts by weight crosslinker; optionally, 0.000001 to 5 parts by weight crosslinking catalyst; 0.003 to 2.5 parts by weight metal content of a drier if desired and a filler until an aqueous silicone emulsion is formed.

A preferred method of forming the aqueous silicone emulsion using a surface active salt of an oxygen curing compound comprises mixing at high shear and at a temperature between 20°–70° C., 2 to 5 parts water; 100 parts by weight —OH endblocked PDMS polymer; 0.1 to 10 parts by weight of the reaction product of an organic base and a natural drying oil; 1 to 10 parts by weight of a crosslinker; 0.00001 to 2 parts by weight of a crosslinking catalyst, if necessary; 0.05 to 2 parts by weight metal content of a mixture of a surface drier and a through drier and a filler until an aqueous silicone emulsion is formed, then the silicone emulsion is diluted with water to the desired polymer solids content.

A more preferred method of forming the aqueous silicone emulsion using a surface active salt of an oxygen curing compound comprises mixing at high shear and at about 25° C., 2 to 5 parts water; 100 parts by weight —OH endblocked PDMS polymer; 1 to 5 parts by weight of a morpholine salt of tung oil; 1 to 10 parts by weight of an alkoxy silane crosslinker; 0.06 to 2 parts by weight of an organotin compound crosslinking catalyst; 0.05 to 2 parts by weight metal content of a mixture of a surface drier and a through drier and a filler until an aqueous silicone emulsion is formed, then the silicone emulsion is diluted with water to the desired polymer solids content.

Each of the above described methods can also be run by adding the crosslinker and crosslinking catalyst, each if necessary or desired, after an emulsion is formed.

The surface modified silicone elastomeric material formed from the aqueous silicone emulsion upon the evaporation of water has improved properties over other silicone elastomers from aqueous silicone emulsions. These modified surface properties include improved coverage and adhesion of paints, reduced coefficients of friction and reduced staining and dirt pick up, in each case relative to other elastomers from aqueous silicone emulsions.

EXAMPLES

The following examples are presented for illustrative purposes and should not be construed as limiting the present invention which is delineated in the claims. In the examples, part or parts is by weight and unless noted differently the silicone emulsion was prepared at 25° C. In addition, Me stands for methyl and Et stands for ethyl.

(A) Test for Measuring Paint Coverage

Test pieces were made by spreading the silicone emulsion into slabs of 2.54 mm thickness on polyethylene and exposing the slabs to 50% ±5% relative humidity at 23°±2° C. for various lengths of time prior to coating with either an acrylic latex paint or an alkyd paint (oil based). Test is performed using a 25.4 mm wide camel hair brush to apply approximately 38 mm wide paint strip of the paint. Percent paint coverage is estimated within 15–30 sec of applying paint to the surface of the sample.

(B) Test for Measuring Paint Adhesion

The adhesion of the paint to the surface of the cured or curing composition was determined by the tape test method, ASTM-D3359-83, Method B. A square of about 25.4 mm on each side was cross-hatched and then tape with an adhesive surface was pressed firmly on the cross-hatched area and then pulled at about a 180 degree angle. The amount of paint adhered to the elastomer was determined by observing the remaining sections. The test method provides a classification system such that 5B is used for no flaking and 0B is used for greater than 65% flaking with the classifications of 4B, 3B, 2B and 1B being given for paint flakings in between.

(C) Test for Measuring Static Friction

The static friction of the silicone elastomeric materials having a modified surface was determined by the inclined plane test method, ASTM-D4518-85. A weighted sled is placed on a test specimen and the specimen is gradually inclined from the horizontal until the sled begins to slide. The tangent of this angle of inclination is reported as the static friction.

(D) Preparation of Tung Oil Emulsion 2 g Triton® X-100 non ionic surfactant (ethyoxylated nonyl phenol) and 50 g water were charged to a one liter beaker and agitated with an air motor and one inch saw toothed blade. 100 g tung oil was added slowly under agitation and the mixture was stirred for five minutes to create a stable water in oil emulsion. This emulsion was reduced with another 100 g water which was premixed with 2.22 g of Tergitol® TMN-10 nonionic surfactant (ethoxylated trimethylnonanol HLB=16.1). This mixture was inverted to an oil in water emulsion by three passes at 5000 psi in a microfluidizer. The resulting emulsion was stable for several months at room temperature and had an average particle size of 428 nm.

(E) Preparation of Tung Oil Emulsion with Driers 2.0 g Triton® X-100 and 50 g water were charged to a one liter beaker and agitated with an air motor and one inch saw toothed blade. 100 g tung oil , 0.42 g 6% cobalt octoate (metal drier) and 3.34 g 6% zirconium octoate (metal drier) were premixed and then slowly added under agitation and the mixture was stirred for five minutes to create a stable water in oil emulsion. This emulsion was reduced with 100 g water which was premixed with 2.22 grams of Tergitol® TMN-10. This mixture was inverted to an oil in water emulsion by three passes at 5000 psi in a microfluidizer. The resulting emulsion was stable for several months at room temperature and had an average particle size of 397 nm.

(F) Preparation of Tung Oil and Driers-Neat 100 g of tung oil, 0.42 g 6% Cobalt Octoate and 3.34 g 12% zirconium octoate were mixed neat in a jar.

(G) Preparation of the Morpholine Salt of Tung Oil 27.84 g tung oil and 8.71 g morpholine were mixed in a jar, purged with nitrogen and placed in a 50° C. oven for 1 hr. No separation occurred and the resulting mixture was stable for several weeks at room temperature.

(H) Preparation of Morpholine Salt of Chain Stopped Alkyd Resin

A formulation was prepared containing 53.3% of a chain stopped air dry alkyd resin having 75% solids in Butoxy ethanol/sec-butanol 50/50, acid no.=38.7, (Chempol® 10-0091, Cook Composites and Polymers CCP Polymers Division), 4.5% morpholine, 0.4% of a solution of 6% cobalt octoate, 0.5% of a solution of 12% zirconium octoate, 0.8% of a solution of 6% calcium octoate and 50.5% water. The first 5 materials were added sequentially to a slowly stirring container and the resulting material was a clear amber colored homogeneous solution. The water was added slowly with continued agitation to yield a clear amber colored homogeneous solution. A sample of this material was cast on a glass slide and allowed to air dry for seven days at 25°+/−5° C. and 50+/−2% relative humidity. The sample dried to a tack free film which was insoluble in butoxy ethanol/sec-butanol 50/50.

Example 1

(a) 100 parts —OH endblocked PDMS polymer having a viscosity of 50 Pa s at 25° C. and a weight average molecular weight of 110,000, 2 parts $Me_3SiO(Me_2SiO)_3(Me(ON(Et)_2SiO)_5SiMe_3$ crosslinker, 2 parts methyltrimethoxysilane $(CH3)Si(OCH3)3$ and 1 part of a mixture of 5 parts of a reaction product obtained by cold blending 74.6 parts of a short chain —OH endblocked PDMS fluid with a degree of polymerization of about 7 to 9 and a viscosity of 0.04 Pa s at 25° with 15.2 parts N-(2-aminoethyl)-3-aminopropyltrimethoxysilane and 10.2 parts methyltrimethoxysilane and 0.36 parts glacial acetic acid were added to a whip mixer bowl and mixed for 30 sec under 25 in. vacuum. 2 parts Tergitol® TMN-6, a nonionic surfactant (ethoxylated trimethylnonanol, HLB=11.7) and 2 parts water were added and mixed for 2 cycles of 30 sec. each. The oil in water emulsion was then diluted with 4.7 parts water and mixed for an additional 30 sec. 47.4 parts filler (3 micron particle size ground calcium carbonate) was added as an 84% slurry and mixed for 2 30 sec. cycles. The sealant was then transferred to a Semco® cartridge and shelf aged a minimum of 3 days prior to casting and testing according to the method described in (A) above.

(b) Same procedure followed as in Example 1(a) except an —OH and trimethyl endblocked PDMS polymer having a viscosity of 25 Pa s at 25° C. and a weight average molecular weight of about 30,000 was substituted for the diorganosiloxane polymer used in Example 1(a). The sealant was then transferred to a Semco® cartridge and shelf aged a minimum of 3 days prior to casting and testing according to the method described in (A) above.

(c) Same procedure as Example 1(b) except 1 part tung oil neat was mixed in after emulsification before addition of the filler. The sealant was then transferred to a Semco® cartridge and shelf aged a minimum of 3 days prior to casting and testing according to the method described in (A) above.

(d) Same procedure as Example 1(b) except 1 part tung oil neat was mixed in before emulsification. The sealant was then transferred to a Semco® cartridge and shelf aged a minimum of 3 days prior to casting and testing according to the method described in (A) above.

These slabs from Examples 1(a), 1(b), 1c) and 1(d) above were painted after various drying times and the paint coverage test performed. See Table 1 for results.

TABLE 1

| | Percent (%) Paint Coverage After Various Drying Times | | | | |
|---|---|---|---|---|---|
| Samples | 1 hr | 2 hr | 24 hr | 1 wk | 7 wk |
| 1(a)* | 100 | <70 | <60 | <60*** | ** |
| 1(b)* | 100 | <70 | <50 | <50*** | ** |

TABLE 1-continued

| | Percent (%) Paint Coverage After Various Drying Times | | | | |
|---|---|---|---|---|---|
| Samples | 1 hr | 2 hr | 24 hr | 1 wk | 7 wk |
| 1(c) | ** | ** | ** | <50 | <80 |
| 1(d) | ** | ** | ** | <50 | <80 |

*Comparative - no tung oil added
**no testing done
***paintability did not improve after 1 week of dry room temperature aging Example 2

To a 300 l Turello pot was added 438.6 parts —OH endblocked polydimethylsiloxane (PDMS) polymer having a viscosity of 50 Pa s at 25° C. and a weight average molecular weight of about 110,000 and 9.06 parts $Me_3SiO(Me_2SiO)_3(Me(ON(Et)_2SiO)_5SiMe_3$. This mixture was mixed for 1 min and a mixture of 13.89 parts Tergitol® TMN-10 diluted with 11.11 parts water was added over a two min period under agitation. This resulted in a clear nonflowing gel. This gel was reduced to 79.4% solids through the addition of 90.06 parts water to yield approximately 550 parts of crosslinked silicone emulsion.

8 formulations were prepared by mixing 100 parts of the crosslinked silicone emulsion described herein with either 1 part or 5 parts of the tung oil preparations described in (D), (E) and (F) above or tung oil neat and then packaging each formulation immediately in Semco® cartridges. See Table 2 for each formulation.

TABLE 2

| | Formulation | | | | | | | |
|---|---|---|---|---|---|---|---|---|
| Ingredient (in parts) | 1 | 2 | 3 | 4 | 5 | 6 | 7 | 8 |
| Crosslinked Emulsion | 100 | 100 | 100 | 100 | 100 | 100 | 100 | 100 |
| D | 1 | 5 | none | none | none | none | none | none |
| E | none | none | 1 | 5 | none | none | none | none |
| F | none | none | none | none | none | none | 1 | 5 |
| Tung oil heat | none | none | none | none | 1 | 5 | none | none |

Immediately after compounding, these 8 formulations were cast and tested in accordance with (A) above. All samples had paint coverage of 100w with latex and oil-based paint while wet. After 7 days dry time, all eight formulations still had paint coverage of 100% with latex and oil-based paint. The samples had developed a matte finish and after 30 days dry time crosshatch adhesion on the coated sealants performed as described in (B) above was 5B (100% cohesive).

Storage stability of these formulations after 3 months at room temperature indicated that the formulation containing 5 parts of emulsified tung oil without driers (formulation 2) had begun to separate evidenced by an accumulation of yellowed resinous material around the plunger of the Semco® cartridge. The remaining samples showed no signs of separation and all eight formulation samples dried to tack free elastomers with modified surfaces.

Another formulation containing 100 parts crosslinked emulsion and 4 parts of the material prepared as described in (F) above was prepared and tested for static friction by the method described in (C) above. Samples were cast immediately after compounding as 1.27 mm thick slabs on glossy cardboard support stock. These samples were allowed to dry for 2 wk at 23°+/−5° C. and 50+/−5% relative humidity. The coefficient of static friction for the modified surface of the elastomer was determined to be 0.54 (Angle=28.5°). The coefficient of static for the unmodified surface was greater than 1 since it did not move even at a 90° angle.

Example 3

4 formulations were prepared in an identical manner as described below except for the type and amount of tung oil added. To a 300 ml Whip Mix cup was charged 100 parts —OH endblocked PDMS polymer having a viscosity of 50 Pa s at 25° C. and a weight average molecular weight of 110,000 and an amount of tung oil with driers prepared as described in (F) above or tung oil neat and this was stirred for 30 sec under vacuum to form an opaque dispersion. To this mixture was added 2 parts $Me_3SiO(Me_2SiO)_3(Me(ON(Et)_2)SiO)_5SiMe_3$ crosslinker and the mixture was stirred for 30 sec under vacuum. This mixture was emulsified by the addition of 2.78 parts Tergitol® TMN-10 and 3 parts water and stirring 30 sec under vacuum. This emulsion was further diluted with 17 parts water in 3 additions of 5, 6 and 6 parts to generate an 80% solids emulsion. Table 3 describes each formulation.

TABLE 3

| Ingredient (in parts) | Formulation | | | |
|---|---|---|---|---|
|  | 1 | 2 | 3 | 4 |
| Tung Oil Neat | 1 | 5 | none | none |
| Tung Oil + Driers (F) | none | none | 1 | 5 |

Immediately after compounding, the 4 formulations were cast and tested in accordance with (A) above. All samples had paint coverage of 100% with latex and oil based paint while wet. After 7 days dry time, all eight samples had paint coverage of 100% with latex and oil-based paint. The samples developed a matte finish and after 30 days dry time crosshatch adhesion performed in accordance with (B) above was 5B (100% cohesive).

Example 4

(a) 100 parts —OH endblocked PDMS polymer having a viscosity of 50 Pa s at 25° C. and a weight average molecular weight of 110,000 and 5 parts of the morpholine salt of tung oil mixture prepared as described in (G) above were mixed for 30 sec in a whip pot. 3.5 parts water was then added and the mixture stirred for an additional 30 sec under vacuum at which time an oil in water emulsion resulted. This emulsion was further reduced with 16.5 parts water. Half of this emulsion was then let stand for several months at room temperature and it remained stable during that time.

The other half of the emulsion was mixed with 0.08 parts dibutyltin diacetate (DBTDA) and 0.26 parts isobutyltrimethoxysilane (IBTMS) and the mixture stirred for 30 sec on a whip mix pot. The emulsion was allowed to stand at room temperature for 1 hr prior to casting into slabs and testing in accordance with (A) above. The slabs dried to tack free elastomers and a sample painted after 3 days at room temperature had 100% paint coverage with latex paint. Another sample painted after 26 days at room temperature also had 100% paint coverage with latex paint. Adhesion was tested after 7 days of paint drying in accordance with (B) above and appeared to be poor (1B).

(b) To a Hauschild cup was added 50 parts —OH endblocked PDMS polymer having a viscosity of 50 Pa s at 25° C. and a weight average molecular weight of 110,000 and 1 part $Me_3SiO(Me_2SiO)_3(Me(ON(Et)_2)SiO)_5SiMe_3$. This material was mixed for 10 sec on the Hauschild dental mixer. To this mixture was added 3.50 parts of the morpholine salt of the chain stopped alkyd mixture prepared as described in (H) above and the material was mixed for an additional 12 sec on the Hauschild to form a water in oil emulsion. 1 part of a hydrosilyation product of heptamethyl trisiloxane and an ethoxylated allyl alcohol HLB=10.5 (Dow Corning® 5211 surfactant) was added and the mixture was inverted to an oil in water emulsion with a 12 sec spin on the Hauschild. This emulsion was diluted to 80% solids content by the addition of 9 parts of water in 2 increments with 12 sec mixing on the Hauschild between additions.

Immediately after compounding, this formulation was cast and tested in accordance with (A) above. One sample dried 4 days had a slightly tacky surface but had paint coverage of 100% with oil based paint. Another sample dried 7 days was tack-free and had paint coverage of 100% with latex paint.

(c) 50 parts of the crosslinked silicone emulsion from Example 2 was mixed with 3.5 parts of the morpholine salt of the chain stopped alkyd mixture prepared as described in (H) above by spinning on a Hauschild dental mixer. Immediately after compounding, this formulation was cast and tested in accordance with (A) above. One sample dried 4 days had a slightly tacky surface but had paint coverage of 100% with oil based paint. Another sample dried 7 days was tack-free and had paint coverage of 100% with latex paint.

Example 5

5 formulations were prepared using the same procedure used as in Example 1(c) above (tung oil added after emulsification before addition of filler) except different amounts of tung oil were added. Immediately after compounding, the formulations were cast and tested in accordance with (A) above. See Table 4 for results.

TABLE 4

| Percent (%) Paint Coverage After Various Drying Times | | | | | | |
|---|---|---|---|---|---|---|
| Tung Oil, in parts | 2 hr | 4 hr | 1 wk | 2 wk | 4 wk | 6 wk |
| 1 | 50 | <50 | 60 | 85 | >90 | 100 |
| 2.5 | 50 | <50 | 60 | 85 | >90 | 100 |
| 5 | 50 | <50 | 60 | 85 | >90 | 100 |
| 7.5 | 50 | <50 | 60 | 85 | >90 | 100 |
| 10 | 50 | <50 | 60 | 85 | >90 | 100 |

Example 6

5 formulations were prepared using the same procedure as in Example 1 (d) (oxygen curing compound added before emulsification) above except each formulation contains 1 part of various oxygen curing compounds. Immediately after compounding, the formulations were cast and tested in accordance with (A) above. See Table 5 for results.

TABLE 5

| Percent (%) Paint Coverage After Various Drying Times | | |
|---|---|---|
| Oxygen Curing Compound | 1 wk | 2 wk |
| tung oil | <50 | <80 |
| linseed oil | <50 | <80 |
| oitica oil | <50 | <80 |
| fluorocarbon/aliphatic polymeric isocyanate* | <50 | <80 |
| alkyd resin | <50 | <80 |

*reaction product of 0.1247 equivalents of a isophoronediisocyanate prepolymer (APC-722, Air Products, Inc.) and 0.0183 equivalents of a fluorocarbon alcohol (FC-10, 3M Co.).

Example 7

5 formulations were prepared using the same procedure as in Example 1 (c) (oxygen curing compound added after emulsification before addition of filler) above except each formulation contains 1 part of various oxygen curing compounds. Immediately after compounding, the formulations were cast and tested in accordance with (A) above. See Table 6 for results.

TABLE 6

| Percent (%) Paint Coverage After Various Drying Times | | |
|---|---|---|
| Oxygen curing compound | 1 wk | 2 wk |
| tung oil | <50 | <80 |
| linseed oil | <50 | <80 |
| oitica oil | <50 | <80 |
| fluorocarbon/aliphatic polymeric isocyanate* | ** | ** |
| alkyd resin | <50 | <80 |

*reaction product of 0.1247 equivalents of a isophoronediisocyanate prepolymer (APC-722, Air Products, Inc.) and 0.0183 equivalents of a fluorocarbon alcohol (FC-10, 3M Co.).
**no inversion to an oil in water emulsion.

Example 8

(a) 4296 parts —OH endblocked PDMS polymer having a viscosity of 50 Pa s at 25° C. and a weight average molecular weight of 110,000 was put in a Turello pot and stirred under vacuum at 600 rpm with a scraper bar. 107 parts Tergitol® TMN-6, nonionic surfactant and 43 parts Hostapur® SAS 60, sodium secondary alkane sulfonate (an anionic surfactant) were slowly added. The resulting water in oil emulsion was stirred for 5 min at 600 rpm with scraper bar. The agitation was increased to 1200 rpm and 100 parts water was added. This inverted the pot contents to an oil in water emulsion evidenced by the formation of a non flowable clear gel that is further dilutable with water. The Turello pot was agitated for another 5 min at 1000 rpm. The homogenous clear gel was reduced to 95% polymer solids by the addition of 112.5 parts water. This 95% solids emulsion was crosslinked with the sequential addition of 43 parts IBTMS and 21.5 parts dibutyltindilaurate. Immediately after compounding, the crosslinked high solids silicone emulsion was cast and tested in accordance with (A) above. Results are provided in Table 7.

(b) Samples of the uncured sealant of Example 8(a) were packaged in Semco® cartridges and stored at 50° C. for 1 wk and then cast and tested according to (A) above. Results are provided in Table 7.

(c) Same procedure as in Example 8(a) except 43 parts of tung oil were added to the —OH endblocked PDMS polymer prior to the addition of the Tergitol® TMN-6 and Hostapur® SAS-60. Immediately after compounding, the crosslinked high solids silicone emulsion was cast and tested in accordance with (A) above. Results are provided in Table 7

(d) Same procedure as in Example 8(b) except 43 parts of tung oil were added to the —OH endblocked PDMS polymer prior to the addition of the Tergitol® TMN-6 and Hostapur® SAS-60. Samples of the uncured sealant of were packaged in Semco® cartridges and stored at 50° C. for 1 wk and then cast and tested according to (A) above. Results are provided in Table 7.

TABLE 7

| | Percent (%) Paint Coverage | | |
|---|---|---|---|
| Samples | Drying Time Before Painting | Latex Paint | Oil (alkyd) Paint |
| 8(a)/8(b)* | 1 hr | 95–100%/40–70% | 95–100%/95–100% |
| 8(c)/8(d) | 1 hr | 95–100%/95–100% | 95–100%/95–100% |
| 8(a)/8(b)* | 4 hr | 95–100%/70–95% | 95–100%/95–100% |
| 8(c)/8(d) | 4 hr | 95–100%/95–100% | 95–100%/95–100% |
| 8(a)/8(b)* | 24 hr | 95–100%/70–95% | 95–100%/95–100% |
| 8(c)/8(d) | 24 hr | 95–100%/95–100% | 95–100%/95–100% |
| 8(a)/8(b)* | 48 hr | 95–100%/10–40% | 95–100%/95–100% |
| 8(c)/8(d) | 48 hr | 95–100%/95–100% | 95–100%/95–100% |
| 8(a)/8(b)* | 1 wk | 95–100%/10–70% | 95–100%/95–100% |
| 8(c)/8(d) | 1 wk | 95–100%/95–100% | 95–100%/95–100% |
| 8(a)/8(b)* | 3 wk | 95–100%/40–70% | 95–100%/95–100% |
| 8(c)/8(d) | 3 wk | 95–100%/95–100% | 95–100%/95–100% |

*Comparative examples with no tung oil

Example 9

(a) An emulsion polymerized, anionically stabilized, hydroxy endblocked PDMS polymer emulsion, having a solids content of about 70% by weight and having a pH of about 10, the average diameter of the emulsion particles being less than 600 nm, and the polymer having a weight average molecular weight of greater than 240,000, was prepared as described in U.S. Pat. No. 3,697,469. The emulsion contained about 1% sodium lauryl sulfate anionic surfactant. 100 parts of this emulsion was charged to a 2 l Ross mixer, 0.309 parts of stannous octoate (stannous bis (2-ethylhexanoate)) was added, and the emulsion was stirred for 5 min. Next, 0.618 parts chloropropyltrimethoxysilane were added dropwise to the emulsion while stirring. Following the addition of chloropropyltrimethoxysilane, the emulsion was stirred an additional 3 min. Then the emulsion was allowed to remain undisturbed at room temperature for 1 hr. Following this period, the emulsion was again stirred, while 1.442 parts 2-amino-2-methyl-1-propanol (AMP) were added dropwise. After all of the AMP was added, stirring was continued while 0.721 parts of tung oil (neat) was added dropwise. Following the complete addition of the tung oil, the emulsion was stirred for an additional 5 min. The silicone emulsion was immediately packaged into Semco® cartridges and allowed to rest for 7 days. After that period the sealants were cast and tested according to the method of (A) described above. Paint adhesion was tested and classified in accordance with the method described in (B) above 7 days after paint application. Results are provided in Table 8(a).

TABLE 8(a)

| Drying Period Prior to Paint Application | Percent % Paint Coverage | | Adhesion | |
|---|---|---|---|---|
| | Latex Paint | Alkyd Paint | Latex Paint | Alkyd Paint |
| 1 hr | 0 | 95–100 | 3B–4B | 0B |
| 4 hr | 0 | 95–100 | 0B | 0B |
| 24 hr | 40–70 | 95–100 | 0B | 4B–5B |
| 48 hr | 70–95 | 95–100 | 0B | 4B–5B |
| 7 days | 70–95 | 95–100 | 0B | 4B–5B |
| 21 days | 95–100 | 95–100 | 4B–5B | 4B–5B |

(b) 100 parts of the anionically stabilized emulsion, described in Example 8(a) above, was charged to a 2L Ross mixer, 0.307 parts of stannous octoate (stannous bis(2-ethylhexanoate)) was added, and the emulsion was stirred for 5 min. Next, 0.614 parts chloropropyltrimethoxysilane were added dropwise to the emulsion while stirring. Following the addition of chloropropyltrimethoxysilane, the emulsion was stirred an additional 3 min. The emulsion was then allowed to remain undisturbed at room temperature for 1 hour. Following this period, the emulsion was again stirred, while 1.433 parts 2-amino-2-methyl-1-propanol (AMP) were added dropwise. The emulsion was immediately packaged into Semco® cartridges and allowed to rest for 7 days. After that period the sealants were cast and tested according to the method of (A) described above. Paint adhesion was tested in accordance with the method described in (B) above 7 days after paint application. Results are provided in Table 8(b).

TABLE 8(b)

| Drying Period Prior to Paint Application | Percent % Paint Coverage | | Adhesion | |
|---|---|---|---|---|
| | Latex Paint | Alkyd Paint | Latex Paint | Alkyd Paint |
| 1 hr | 40–70 | 95–100 | 0B–1B | 0B |
| 4 hr | 40–70 | 95–100 | 0B | 0B |
| 24 hr | 40–70 | 95–100 | 0B | 0B |
| 48 hr | 95–100 | 95–100 | 0B | 0B |
| 7 days | 0 | 95–100 | 0B | 0B |
| 21 days | 10–40 | 95–100 | 0B | 0B |

We claim:

1. An aqueous silicone emulsion for forming elastomeric silicone material, the silicone emulsion comprising:

(A) water;

(B) a plurality of particles dispersed in the water comprising a crosslinked product of a diorganosiloxane polymer having the general formula

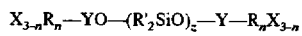

where n is 0, 1, 2 or 3, z is an integer from 200 to 10,000,

X is a hydroxyl group, an alkenyl group or any hydrolyzable group,

Y is a Si atom or a —Si—$(CH_2)_m$SiR$'_2$— group with m being a positive integer, R is individually selected from the group consisting of substituted and unsubstituted monovalent hydrocarbon radicals having from 1–15 carbon atoms, and R' is individually selected from the group consisting of X and substituted and unsubstituted monovalent hydrocarbon radicals having from 1–15 carbon atoms, provided, at least 90% of the R' groups are selected from unsubstituted monovalent hydrocarbon radicals having from 1–15 carbon atoms;

(C) a surfactant for stabilizing the particles dispersed in the water; and (D) an amount of an oxygen curing compound or a salt thereof effective for surface modification of the silicone elastomeric material formed from the silicone emulsion upon evaporation of the water.

2. The silicone emulsion of claim 1, wherein the oxygen curing compound is a natural drying oil and the salt of the oxygen curing compound is a reaction product of an organic base and a natural drying oil.

3. The silicone emulsion of claim 2, wherein the natural drying oil is tung oil, linseed oil or oiticica oil.

4. The silicone emulsion of claim 2, wherein the reaction product of the organic base and the natural drying oil is a morpholine salt of tung oil.

5. The silicone emulsion of claim 2, wherein the effective amount of component (D) is 0.1 to 10 parts by weight based on 100 parts by weight of the diorganosiloxane polymer.

6. The silicone emulsion of claim 5, wherein for the diorganosiloxane polymer X is a hydroxyl group; R and R' are each methyl groups and Y is a silicon atom.

7. The silicone emulsion of claim 6, wherein the crosslinked product is formed by reaction of 100 parts by weight of the diorganosiloxane polymer with 0.1 to 50 parts by weight of a crosslinker.

8. The silicone emulsion of claim 7, wherein the crosslinked product is formed in the presence of 0.000001 to 5 parts by weight per 100 parts by weight of the diorganosiloxane polymer of a crosslinking catalyst.

9. The silicone emulsion of claim 8, wherein the amount of surfactant is 0.5 to 5 parts by weight per 100 parts by weight of the diorganosiloxane polymer of the surfactant.

10. The silicone emulsion of claim 9, and further comprising 0.003 to 2.5 parts by weight metal content per 100 parts by weight of the diorganosiloxane polymer of a mixture of a through drier and a surface drier.

11. The silicone emulsion of claim 10, and further comprising a filler.

12. The silicone emulsion of claim 1, comprising 8 to 1000 parts by weight water; 100 parts by weight —OH endblocked polydimethylsiloxane polymer; 1 to 5 parts by weight tung oil; 1 to 10 parts by weight of a crosslinker selected from the group consisting of an alkoxy silane and an aminoxy functional siloxane; 0.06 to 2 parts by weight of an organotin compound crosslinking catalyst; 0.5 to 5 parts by weight of a nonionic surfactant; 0.05 to 2 parts by weight metal content of a mixture of a surface drier and a through drier and a filler.

13. The silicone emulsion of claim 1, comprising 8 to 1000 parts by weight water; 100 parts by weight —OH endblocked polydimethylsiloxane polymer; 1 to 5 parts by weight tung oil; 1 to 10 parts by weight of an aminoxy functional siloxane crosslinker; 0.5 to 5 parts by weight of a nonionic surfactant; 0.05 to 2 parts by weight metal content of a mixture of a surface drier and a through drier and a filler.

14. An aqueous silicone emulsion for forming elastomeric silicone material, the silicone emulsion comprising:

(A) water;

(B) a plurality of particles dispersed in the water comprising a crosslinked product of a diorganosiloxane polymer having the general formula $X_{3-n}R_n$—YO—$(R'_2SiO)_z$—Y—$R_nX_{3-n}$ where n is 0, 1, 2 or 3, z is an integer from 200 to 10,000, X is a hydroxyl group, an alkenyl group or any hydrolyzable group, Y is a Si atom or a —Si—$(CH_2)_m$SiR'$_2$— group with m being a positive integer, R is individually selected from the group consisting of substituted and unsubstituted monovalent hydrocarbon radicals having from 1–15 carbon atoms, and R' is individually selected from the group consisting of X and substituted and unsubstituted monovalent hydrocarbon radicals having from 1–15 carbon atoms, provided, at least 90% of the R' groups are selected from unsubstituted monovalent hydrocarbon radicals having from 1–15 carbon atoms; and (D) an amount of a surface active salt of an oxygen curing compound effective for surface modification of the silicone elastomeric material formed from the silicone emulsion upon evaporation of the water.

15. The silicone emulsion of claim 14, wherein the surface active salt of the oxygen curing compound is a reaction product of an organic base and a natural drying oil.

16. The silicone emulsion of claim 15, wherein the natural drying oil is tung oil, linseed oil or oiticica oil.

17. The silicone emulsion of claim 15, wherein the reaction product of the organic base and the natural drying oil is a morpholine salt of tung oil.

18. The silicone emulsion of claim 15, wherein the effective amount of component (D) is 0.1 to 10 parts by weight of diorganosiloxane polymer.

19. The silicone emulsion of claim 18, wherein for the diorganosiloxane polymer X is a hydroxyl group; R and R' are each methyl groups and Y is a silicon atom.

20. The silicone emulsion of claim 19, wherein the crosslinked product is formed by reaction of 100 parts by weight of the diorganosiloxane polymer with 0.1 to 50 parts by weight of a crosslinker.

21. The silicone emulsion of claim 20, wherein the crosslinked product is formed in the presence of 0.000001 to 5 parts by weight per 100 parts by weight of the diorganosiloxane polymer of a crosslinking catalyst.

22. The silicone emulsion of claim 21, further comprising 0.003 to 2.5 parts by weight metal content per 100 parts by weight of the diorganosiloxane polymer of a mixture of a through drier and a surface drier.

23. The silicone emulsion of claim 22, further comprising a filler.

24. The silicone emulsion of claim 14, comprising 8 to 1000 parts water; 100 parts by weight —OH endblocked polydimethylsiloxane polymer; 1 to 5 parts by weight of a morpholine salt of tung oil; 1 to 10 parts by weight of an alkoxy silane crosslinker; 0.06 to 2 parts by weight of an organotin compound crosslinking catalyst; 0.05 to 2 parts by weight metal content of a mixture of a surface drier and a through drier and a filler.

* * * * *